United States Patent [19]

Martinez-Vera et al.

[11] 4,224,057
[45] Sep. 23, 1980

[54] METHOD FOR CARBURIZING SPONGE IRON

[75] Inventors: Enrique R. Martinez-Vera; Jorge D. Berrún-Castañón, both of Monterrey, Mexico

[73] Assignee: Hylsa, S.A., Monterrey, Mexico

[21] Appl. No.: 67,665

[22] Filed: Aug. 20, 1979

[51] Int. Cl.² .......................................... C21B 13/02
[52] U.S. Cl. ............................ 75/35; 148/16.5; 266/81
[58] Field of Search ................................ 75/33–38; 148/16.5; 266/80, 81

[56] References Cited

U.S. PATENT DOCUMENTS

| | | | |
|---|---|---|---|
| 2,873,183 | 2/1959 | Pike | 75/35 |
| 3,189,438 | 6/1965 | Von Bogdandy | 75/34 |
| 3,369,888 | 2/1968 | Cruse, Jr. | 75/34 |
| 3,375,098 | 3/1968 | Marshall | 75/35 |
| 3,551,138 | 12/1970 | Brown et al. | 75/26 |
| 3,765,872 | 10/1973 | Celada et al. | 75/34 |
| 3,782,920 | 1/1974 | Anthes et al. | 75/37 |
| 4,046,557 | 9/1977 | Beggs | 75/35 |
| 4,049,440 | 9/1977 | Beggs | 75/35 |
| 4,054,444 | 10/1977 | Clark et al. | 75/35 |

Primary Examiner—M. J. Andrews
Attorney, Agent, or Firm—Curtis, Morris & Safford

[57] ABSTRACT

Sponge iron is carburized in the cooling zone of a vertical shaft iron ore reduction reactor by causing a carbon-containing gas to circulate in a closed loop including the cooling zone of the reactor and an external conduit containing a quench cooler and a pump. Improved control of the carburization of the sponge iron is achieved by measuring the specific gravity of the circulating gas and using the measured specific gravity value as a control variable effectively to regulate the flow of make-up carbon-containing gas to the cooling loop.

16 Claims, 3 Drawing Figures

METHOD FOR CARBURIZING SPONGE IRON

This invention relates to the gaseous reduction of particulate metal oxide ores to metals in particulate form in a moving bed, vertical shaft reactor, and more particularly, to a method of producing by direct gaseous reduction sponge metal having a predetermined desired degree of carburization. In the following description the method is illustratively described as applied to the reduction of iron ore to sponge iron. However, as the description proceeds, it will be apparent to those skilled in the art that the invention is also applicable to the treatment of ores other than iron ore.

Broadly speaking the production of sponge iron in a vertical shaft, moving bed reactor ordinarily involves two principal steps, namely, reduction of the ore in a reduction zone with a suitable hot reducing gas, typically a gas largely composed of carbon monoxide and hydrogen, at temperatures of the order of 850° to 1100° C., preferably 900° to 1000° C., and cooling the resulting sponge iron with a gaseous coolant to a temperature of the order of say 100° to 200° C., preferably below 100° C. A process of this type is disclosed in Celada et al. U.S. Pat. No. 3,765,872 wherein a vertical reactor is used having a reduction zone in the upper portion thereof and a cooling zone in the lower portion thereof. The ore to be treated flows down through the reduction zone wherein it is reduced with an upwardly flowing stream of hot reducing gas, after which the reduced ore flows through a cooling zone wherein it comes into contact with an upwardly flowing stream of cooling gas. The cooled sponge iron is removed at the bottom of the reactor.

Sponge iron produced by a process of the type disclosed in U.S. Pat. No. 3,765,872 is commonly used as a source of iron units for the manufacture of steel in an electric arc furnace. Such sponge iron contains a certain proportion of iron oxide which may be as much as 5% to 15% by weight, since it is uneconomic to attempt to achieve 100% metallization of the ore in the gaseous reduction reactor. As the degree of reduction of the iron-bearing material approaches 100% metallization, it becomes increasingly difficult and requires an excessively long residence time in the reactor to remove the remaining oxygen from the material. While the reduction reaction rate can be increased to some extent by increasing the temperature, such a temperature increase is limited by the fact that the operating temperature must be kept below the sintering temperature if the sponge iron is to remain readily removable from the reactor.

This temperature limitation does not apply to the electric furnace wherein the iron-bearing material is handled in molten form. Thus it is theoretically possible to charge the electric furnace with sponge iron of say 85% metallization and add a sufficient amount of elemental carbon to the furnace charge to react with the oxygen remaining in the iron ore. However, it is difficult to effect an intimate contact between elemental carbon and the sponge iron particles in the electric furnace, especially since the carbon has a much lower density than the iron and tends to become segregated therefrom.

It is known that this problem can be circumvented by carburizing the sponge iron in the reduction reactor. Thus the reduction reactor can be so operated as to cause the sponge iron produced therein to be carburized with the formation of ferric carbide. In general, the desired carbon content of the sponge iron will in most cases fall within the range 1% to 4% by weight. Such carburization may occur in either the reduction zone or the cooling zone, or both. Carburization in the reducing zone is disclosed, for example, in U.S. Pat. No. 3,748,120 wherein the degree of carburization is varied by adjusting the ratio of reductant to oxidant in the hot reducing gas used to reduce the iron ore. This mode of carburization is subject to the disadvantage that the optimum reducing gas composition for carburization and that required for reducing the ore will normally be different and hence the two objectives sought to be attained are to some extent inconsistent. Thus it has been found to be advantageous to effect at least the final carburization in the cooling zone since the cooling zone carburization can be more satisfactorily controlled.

As disclosed in U.S. Pat. No. 3,765,872, the cooling zone of the reduction reactor can be operated in such a manner as to cause the sponge iron particles to be carburized therein as they are cooled. Such carburization can be achieved by using a carbon-containing gas, especially a carbon monoxide containing gas which, within the temperature range of say 400° to 700° C., reacts with the sponge iron to form iron carbide that is largely concentrated in the outer portions of the sponge iron particles. Other patents disclosing carburization of sponge iron with a carbon-containing gas include U.S. Pat. No. 3,136,624 and Canadian Pat. No. 508,951.

As pointed out in U.S. Pat. No. 3,765,872, both the carburizing function and the cooling function of the cooling zone are important. If the product sponge iron is insufficiently cooled before it is exposed to atmospheric air, it tends to re-oxidize. The cooling rate can be conveniently varied and controlled by circulating a cooling gas in a loop that includes the cooling zone of the reactor, and varying the recirculation rate and/or temperature of the cooling gas to obtain the desired degree of cooling. The degree of carburization can be conveniently regulated by controlling the gas composition. It is evident that if both the cooling rate and the degree of carburization are to be optimized in the cooling zone, two separate controllable variables must be regulated.

In accordance with Celada et al. U.S. Pat. No. 3,765,872, this independent control is achieved by providing a cooling loop through which a cooling gas is recirculated and feeding cooling gas to and venting cooling gas from this loop. A predetermined regulated flow of cooling gas having a predetermined composition is fed to the loop and the desired control is achieved in either of two ways. In accordance with one embodiment fresh cooling gas is fed to the loop at a constant rate and the pressure difference between the reduction and cooling zone is measured and used as a control variable to control the flow of vent gas from the cooling loop. With this type of control gas flow between the reduction and cooling zones is minimized to prevent inter-zonal gas flow from modifying the composition of the circulating cooling gas. In accordance with a second embodiment the flow of vent gas is controlled in such a manner that the make-up gas fed to the loop is approximately equal to the flow of vent gas removed from the cooling loop.

While the control systems disclosed in U.S. Pat. No. 3,765,872 provide a greater degree of control of cooling and carburization than was theretofore possible, they still leave something to be desired. As indicated above, the extent to which the sponge iron is carburized depends importantly upon the composition of the cooling gas. Hence the control variable utilized should desirably be more closely related to cooling gas composition than it is in the control systems heretofore used.

It is accordingly an object of the present invention to provide an improved method of controlling the carburization of sponge iron in a moving bed reactor. It is another object of the invention to provide a more accurate method of obtaining a desired concentration of ferric carbide in the sponge iron produced in such a reactor. Other objects of the invention will be in part obvious and in part pointed out hereafter.

The objects of the present invention are achieved in general by cooling the reduced sponge iron with a carbon-containing gas that is circulated in a loop including the cooling zone of the reactor, venting gas from the loop, measuring the specific gravity of the circulating gas, and using the measured specific gravity as a control variable effectively to regulate the addition of carbon-containing make-up gas to the cooling loop. In accordance with a preferred embodiment of the invention this control is achieved by feeding carbon-containing make-up gas to the cooling loop at a predetermined constant rate and removing gas from the loop at a rate responsive to changes in the specific gravity of the circulating gas and thus indirectly regulating interzonal flow of gas between the reduction and cooling zones.

As more fully pointed out below, it has been found that the specific gravity of the carburizing gas used in the cooling zone is functionally related to the degree of carburization that is attained by the sponge iron passing through this zone and hence the specific gravity of the gas can be effectively used as a control variable for controlling the carburization of the product sponge iron.

The objects and advantages of the invention can best be understood and appreciated by reference to the accompanying drawings which illustrate apparatus capable of carrying out the method of the invention and wherein.

Figure 1:
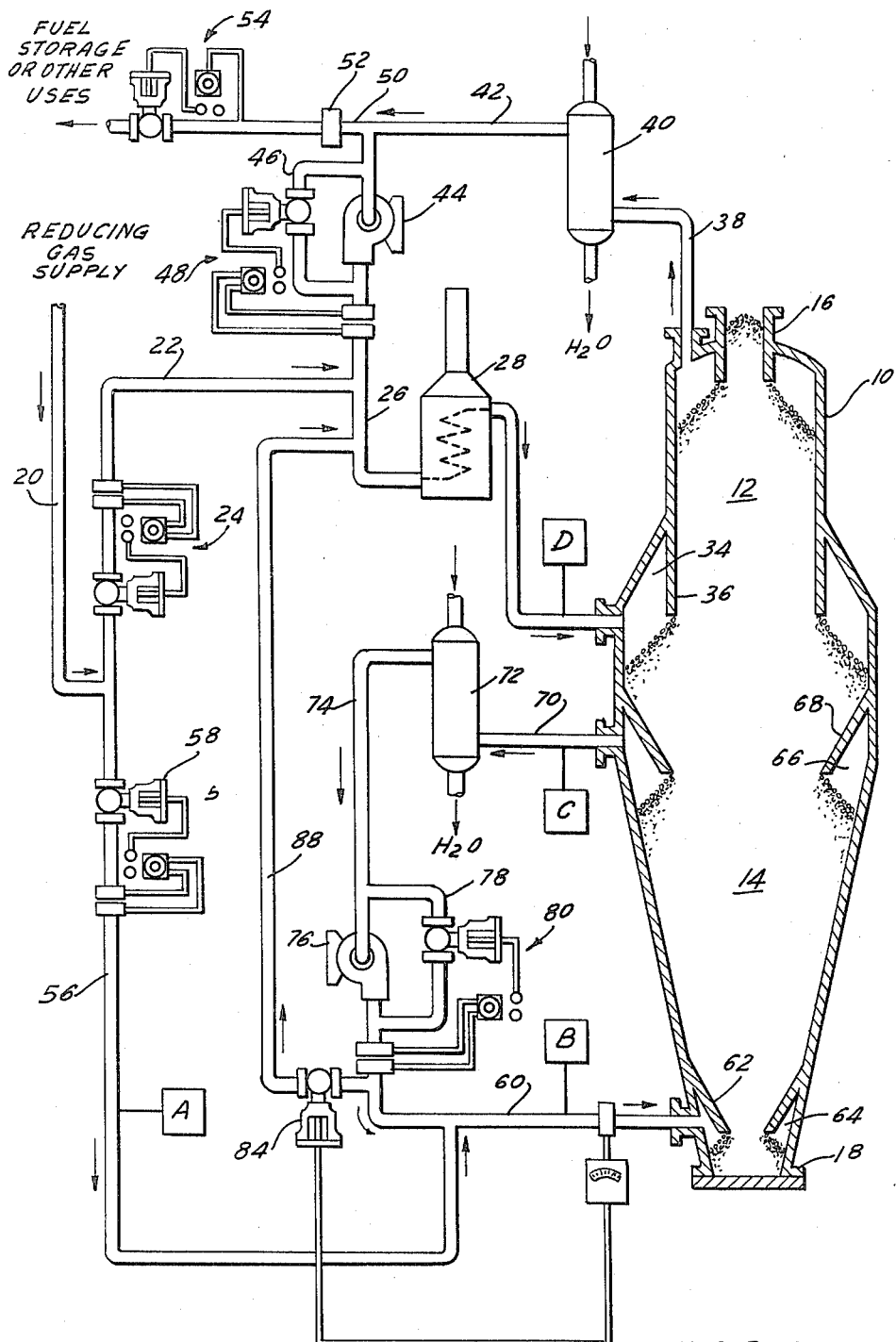
FIG. 1 illustrates a vertical shaft, moving bed gaseous reduction system incorporating a preferred embodiment of the present invention.

Referring to the drawings and more particularly to FIG. 1, the numeral 10 generally designates a vertical shaft reduction reactor having a reduction zone 12 in the upper portion thereof and a cooling zone 14 in the lower portion thereof. Ore to be reduced enters the reactor through an inlet connection 16 at the top of the reactor and sponge iron leaves the reactor near the bottom thereof through a discharge connection 18.

The ore is reduced in the reduction zone 12 of the reactor by a hot reducing gas composed largely of carbon monoxide and hydrogen. The reducing gas may be obtained from any suitable source. For example, it may be a reformed gas prepared by catalytic conversion of a mixture of steam and natural gas in known manner, or alternatively a coke oven gas may be used.

Referring to the left-hand side of FIG. 1, the reducing gas enters the system through a pipe 20 and flows through branch pipe 22 containing flow controller 24 to the reducing gas loop of the system. More particularly, the reducing gas flows from pipe 22 through a pipe 26 to a coil heater 28 which may be gas-fired or otherwise heated to raise the reducing gas temperature to the order of 850° to 950° C. The hot gas from heater 28 is supplied to the reactor through pipe 30 and flows into an annular chamber 34 defined by an internal cylindrical baffle 36 and the wall of the reactor. The hot reducing gas flows upwardly through the bed of ore in the reduction zone 12 and out of the reactor through pipe 38. Within the reduction zone the iron ore is largely reduced to sponge iron.

The reactor effluent gas flows through pipe 38 to a quench cooler 40 wherein it is cooled and de-watered by direct contact with cooling water. From quench cooler 40 the cooled gas flows through pipe 42 to the suction side of a pump 44 and thence into pipe 26 to complete the reducing gas loop. The amount of gas circulated through the reducing gas loop by pump 44 is controlled by providing a by-pass 46 around the pump containing a flow controller 48.

A certain amount of the effluent spent gas from the reduction zone of the reactor is removed from the reducing gas loop through a pipe 50 containing a check valve 52 and a back pressure regulator 54. The gas leaving the system through pipe 50 may be used as a fuel, e.g., in heater 28 or transferred to storage or used for other suitable purposes.

The cooling zone 14 of the reactor also forms part of a gas flow loop and a carbon-containing cooling gas is circulated therethrough to effect carburization of the metal-bearing material in the cooling zone. The carbon-containing gas used to effect carburization of the metal-bearing material in the cooling zone may be of the same composition as the reducing gas used in the reduction zone. More particularly, as shown in FIG. 1, a portion of the reducing gas entering the system through pipe 20 may flow through pipe 56 containing flow controller 58 to pipe 60 of the cooling gas loop.

Gas flowing through pipe 60 is supplied to the bottom of the cooling zone of the reactor. More particularly, the reactor has an internal frusto-conical baffle 62 which cooperates with the wall of the reactor to define an annular space 64 to which the circulating cooling gas is supplied by pipe 60. The cooling gas flows upwardly through the bed of reduced ore in the cooling zone 14 to an annular space 66 defined by the wall of the reactor and another annular frusto-conical baffle 68. As the carbon-containing gas flows upwardly through the cooling zone 14 it reacts with and carburizes the sponge iron contained therein and also cools the sponge iron.

From annular space 66 the gas leaves the reactor through a pipe 70 and passes through a cooler 72 wherein it is cooled and de-watered by direct contact with cooling water. Cooled effluent gas from the cooler 72 flows through pipe 74 to the suction side of a pump 76, thence to the pipe 60 to complete the cooling loop. Recirculation of gas through the loop by pump 76 is controlled by providing a by-pass 78 around the pump containing a flow controller 80.

As indicated above, the present invention is based on applicants' discovery that the degree of carburization that occurs in the cooling zone of the reactor can be effectively controlled by measuring and controlling the specific gravity of the circulating gas. The measured value of the specific gravity can be used in any of several ways to effectively regulate the addition of carbon-containing gas to the cooling loop. In accordance with one embodiment of the process as illustrated in FIG. 1, a predetermined constant flow of fresh make-up carbon-containing gas is supplied to the cooling loop through the pipe 56 and the composition of the gas within the cooling loop is varied by variations in interzonal flow between the reduction zone and the cooling zone. Since such interzonal flow cannot be readily measured or controlled directly, an indirect method of regulating this flow is required. More particularly, in the system of FIG. 1 the specific gravity of the gas flowing through pipe 60 is measured by means of a conventional specific gravity measuring device 82 or may be determined from the compositon of the gas in a manner known in the art. The measured value of the specific gravity is used to regulate a valve 84 in a pipe 88 through which gas is withdrawn from the cooling loop. Thus by regulating effluent gas flow from the cooling loop by means of valve 84, interzonal gas flow is indirectly regulated.

As shown in FIG. 1, the make-up fresh carbon-containing gas fed to the system is used both as the reducing gas in the reduction zone 12 and the cooling gas in the cooling zone 14. Hence the gas withdrawn from the cooling loop through pipe 88 has substantial reducing value and is advantageously transmitted to the reducing gas loop by connecting gas pipe 88 to pipe 26 of the reduction loop as shown.

In order to point out more fully the nature of the present invention, illustrative gas compositions in mol % on a dry basis that may be expected in various portions of the system of FIG. 1 are given in Table I below. Corresponding specific gravities are also given. In the Table "A" is the composition in pipe 56 as indicated in FIG. 1; "B" is the composition in pipe 60; "C" is the composition in pipe 70; and "D" is the composition in pipe 30.

TABLE I

|  | A | B | C | D |
|---|---|---|---|---|
| $H_2$ | 73 | 71 | 71 | 45 |
| CO | 13 | 7 | 6 | 26 |
| $CO_2$ | 8 | 4 | 3 | 20 |
| $CH_4$ | 6 | 18 | 20 | 9 |
| S.G. | 0.33 | 0.277 | 0.263 | 0.635 |

Gas compositions and specific gravities as given in Table I may be expected to yield in a system such as that shown in FIG. 1 a sponge iron carburization of the order of about 2%.

Figure 3:
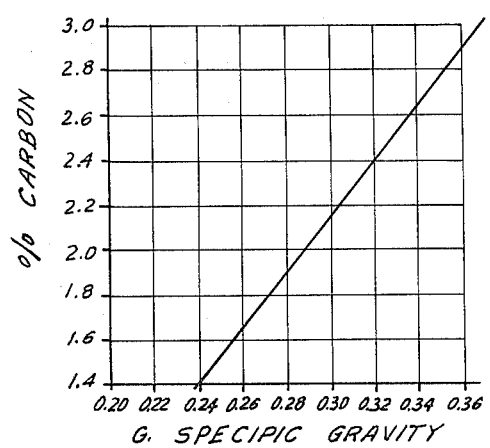
FIG. 3 is a graph showing the relationship between specific gravity and percent carburization for the system of FIG. 1.

It has been found in general that the percentage carburization of the sponge iron varies directly with the specific gravity of the carbon-containing gas flowing through the cooling zone, and that the relationship between specific gravity and carburization is pressure dependent. Referring to FIG. 3 of the drawings, this FIGURE is a graph portraying an illustrative relationship between specific gravity and sponge iron carburization in a system such as that shown in FIG. 1 when operated at a pressue of 2 Kg/cm². Since the relationship between carburization and specific gravity is affected by a number of process variables, it should desirably be determined experimentally for each system and set of operating conditions for which the process of the invention is to be used.

From the values given in Table I it is evident that the gas flowing through the cooling loop comprises approximately 70% hydrogen, together with carbon monoxide, carbon dioxide and methane in an aggregate amount of about 30%. Since carbon-containing gases are consumed in the carburization process, the specific gravity of the gas tends to drop as the carburization reaction proceeds. Hence in order to maintain steady state conditions gas having a relatively high proportion of carbon-containing components and a corresponding relatively high specific gravity must be added to the cooling loop. While it would be possible to supply the required make-up carbon monoxide and other carbon-containing gases by feeding additional fresh reducing gas from an outside source into the cooling loop, it has been found that more efficient operation can be achieved by utilizing for at least a part of the make-up requirement a gas having the composition of the feed gas to the reduction zone. As indicated illustratively in Table 1 above, the gas fed to the bottom of the reduction zone has a carbon monoxide, carbon dioxide and methane content substantially greater than that of the same components in the make-up reducing gas. Hence the gas within the reduction zone is a more effective agent than the make-up reducing gas for increasing the specific gravity and carburizing effectiveness of the gas flowing through the cooling loop.

In accordance with a preferred embodiment of applicants' system as illustrated in FIG. 1 and described above the flow of fresh make-up gas to the cooling loop and the flow of gas leaving the cooling loop are so adjusted as to cause a certain amount of gas to flow from the reduction zone of the reactor down into the cooling zone thereof. To this end the flow of fresh make-up reducing gas through pipe 56 is held substantially constant and the effluent gas flow through pipe 88 is so regulated as to cause relatively high specific gravity gas from the reduction zone to flow downwardly into the cooling zone. By measuring the specific gravity of the gas flowing through the cooling zone and using the measured specific gravity as a control variable to adjust the flow of effluent gas from the cooling loop, the flow of the higher specific gravity gas from the reduction zone into the cooling zone is indirectly regulated to maintain the specific gravity of the gas within the cooling zone at the value required to effect a desired degree of carburization of the sponge iron passing therethrough.

It is evident that gas is effectively removed from the cooling loop due to (a) carburization of the sponge iron according to the equation $2CO \rightarrow C + CO_2$, (b) condensation of water vapor in cooler 72, and (c) outflow of gas through pipe 88. Under certain circumstances the sum of (a), (b) and (c) may be less than the make-up gas entering the loop through pipe 56. Thus it is possible to have upward as well as downward interzonal flow between the reduction and cooling zones.

Figure 2:
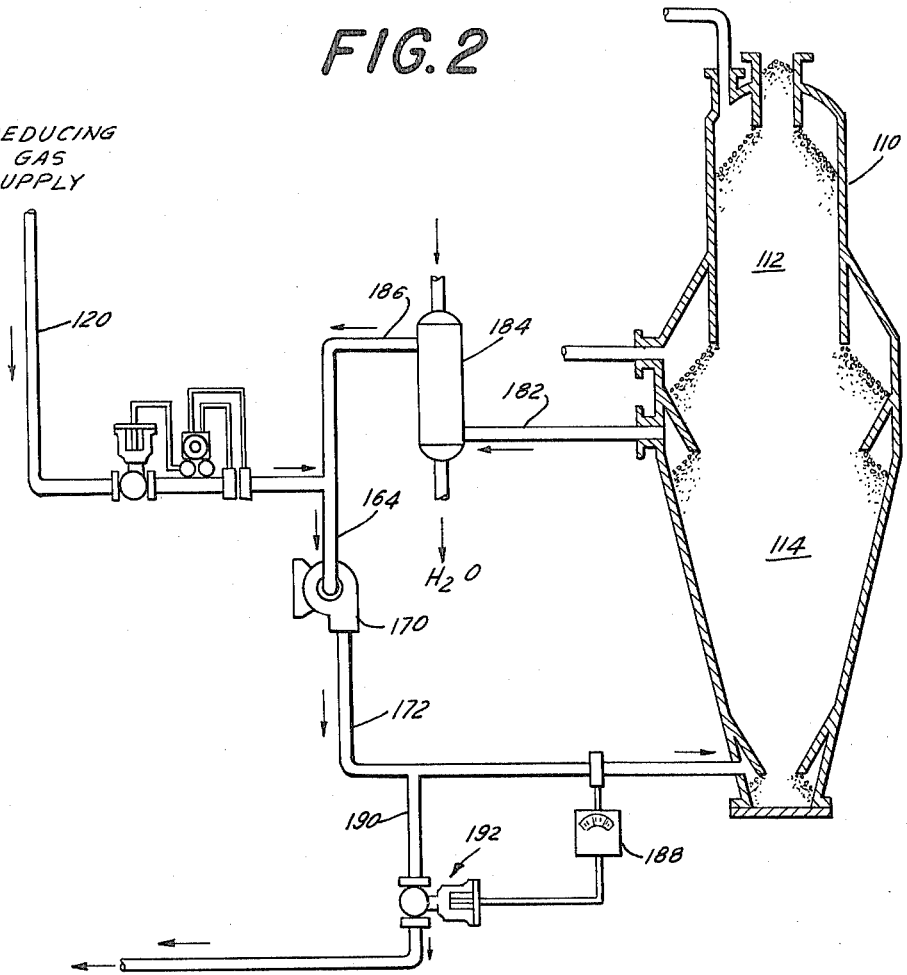
FIG. 2 is a modification of the system of FIG. 1 wherein the vent gas is withdrawn from the cooling loop at a point after addition of make-up reducing gas to the loop.

Referring next to FIG. 2 of the drawings, the system there shown is generally similar to that of FIG. 1. The reactor 110 is provided with a reduction zone 112 in the upper portion thereof and a cooling zone 114 in the lower portion thereof. Reducing gas enters the system through pipe 120 and flows through pipe 164 to the suction side of pump 170 by which it is pumped through pipe 172 to the bottom of the cooling zone. The cooling gas flows up through the cooling zone 114, thence out of the reactor through pipe 182 to cooler 184 from which it is recycled through pipe 186 back to the pump 170. The specific gravity measuring device 188, like the corresponding device 88 of FIG. 1, measures the specific gravity of the flowing gas between the pump discharge and the reactor. However, in the system of FIG.

2 the fixed flow make-up gas supply is connected to the suction side of pump 170 rather than the discharge side thereof.

Gas is continuously withdrawn from the cooling loop through a pipe 190 containing a regulating valve 192 and the output of the specific gravity device 188 is used to regulate the position of valve 192. Thus as in the system of FIG. 1, the measured specific gravity of the circulating gas is used to regulate the flow of vent gas from the cooling loop and thus indirectly control the inflow of the loop of gas that is relatively rich in carburizing constituents.

It is of course to be understood that the foregoing description is intended to be illustrative only and that numerous variations are possible within the scope of the invention. As indicated above, applicants' invention is predicated on their discovery that the degree of carburization of sponge iron in the cooling zone of the reactor can be advantageously controlled by measuring the specific gravity of the circulating gas and using the measured specific gravity as a control variable to effectively regulate the rate of addition of carbon-containing gases to the cooling gas within the loop. In accordance with the preferred embodiment of the invention described above this control is achieved indirectly by using the measured specific gravity value to regulate the flow of effluent gas from the loop. However, it is apparent that alternatively the vent gas flow from the loop could be maintained constant and the output of the specific gravity measuring device could be used to regulate the fresh make-up gas flow or the ratio of fresh make-up gas to vent flow if desired. In this case too interzonal flow of reducing gas through the reactor can be achieved by appropriate relative adjustments of the fresh make-up and effluent gas flows. Other modifications will be apparent to those skilled in the art.

We claim:

1. The method of reducing particulate metal ores to metal particles having a desired degree of carburization in a vertical shaft, moving bed reactor which comprises establishing and maintaining a reduction zone for reducing said particulate metal ore in the upper portion of said bed and a cooling zone for cooling the reduced metal particles in the lower portion of said bed, feeding a hot reducing gas to one point in said reduction zone and causing it to flow through particulate ore in said reduction zone to a second spaced point in said reduction zone to reduce said ore, removing spent reducing gas from said reactor at said second point in said reducing zone, circulating a carbon-containing cooling gas in a loop comprising said cooling zone and a conduit external to said reactor containing a cooler for cooling and a pump for circulating said cooling gas, measuring the specific gravity of the gas flowing through said loop, adding carbon-containing make-up gas to said loop and effectively regulating the rate of addition of carbon-containing make-up gas to said loop in response to variations in the measured specific gravity to maintain the specific gravity of the gas flowing through said cooling zone and hence the amount of carburization that occurs therein at a desired value.

2. The method of reducing particulate metal ores to metal particles having a desired degree of carburization in a vertical shaft, moving bed reactor which comprises establishing and maintaining a reduction zone for reducing said particulate metal ore in the upper portion of said bed and a cooling zone for cooling the reduced metal particles in the lower portion of said bed, feeding a hot reducing gas to one point in said reduction zone and causing it to flow through particulate ore in said reduction zone to a second spaced point in said reduction zone to reduce said ore, removing spent reducing gas from said reactor at said second point in said reducing zone, circulating a carbon-containing cooling gas in a loop comprising said cooling zone and a conduit external to said reactor containing a cooler for cooling and a pump for circulating said cooling gas, measuring the specific gravity of the gas flowing through said loop, adding carbon-containing make-up gas to said loop and removing gas from said loop at a rate regulated in response to variations in the measured specific gravity to maintain the specific gravity of the gas flowing through said cooling zone and hence the amount of carburization that occurs therein at a desired value.

3. A method according to claim 2 wherein the make-up gas added to said loop comprises a stream of fresh reducing gas supplied to the loop at a predetermined regulated rate.

4. A method according to claim 2 wherein the gas removed from said cooling loop is combined with the reducing gas fed to said reduction zone.

5. A method according to claim 2 wherein the make-up carbon-containing gas supplied to said cooling zone comprises both fresh reducing gas and carbon-containing gas from said reduction zone.

6. A method according to claim 5 wherein said fresh reducing gas is supplied to the cooling loop at a predetermined regulated rate and gas is vented from said cooling loop at a flow rate that causes carbon-containing gas to flow downwardly from said reduction zone to said cooling zone.

7. The method of reducing particulate iron ore to sponge iron having a desired degree of carburization in a vertical shaft, moving bed reactor which comprises establishing and maintaining a reduction zone for reducing said particulate ore in the upper portion of said bed and a cooling zone for cooling the sponge iron in the lower portion of said bed, feeding a hot reducing gas to one point in said reduction zone and causing it to flow through particulate ore in said reduction zone to a second spaced point in said reduction zone to reduce said ore, removing spent reducing gas from said reactor at said second point in said reducing zone, circulating a carbon-containing cooling gas in a loop comprising said cooling zone and a conduit external to said reactor containing a cooler for cooling and a pump for circulating said cooling gas, feeding a carbon-containing reducing gas to said loop, measuring the specific gravity of the gas flowing through said loop, venting gas from said cooling loop and regulating the rate at which gas is vented from said cooling loop in response to the measured specific gravity to maintain the specific gravity of the gas flowing through said cooling zone and hence the amount of carburization that occurs therein at a desired value.

8. A method according to claim 7 wherein a stream of fresh carbon-containing gas is added to said loop at a predetermined regulated rate.

9. A method according to claim 7 wherein make-up gas is supplied to said cooling loop from said reduction zone.

10. A method according to claim 7 wherein the specific gravity of the circulating gas is measured in said external conduit after the gas has been cooled.

11. A method according to claim 7 wherein the gas vented from said loop is vented from said external conduit after said gas has been cooled.

12. A method according to claim 7 wherein carbon-containing gas from an external source is added to the external conduit between said cooler and said pump.

13. A method according to claim 12 wherein gas is vented from a point in said loop between said pump and said cooling zone.

14. A method according to claim 7 wherein gas is vented from said external conduit at a point in said loop between said cooler and the point at which fresh reducing gas is added to said external conduit.

15. A method according to claim 7 wherein the gas vented from said loop is combined with the hot reducing gas fed to said reduction zone.

16. A method according to claim 5 wherein said fresh reducing gas is supplied to the cooling loop at a predetermined regulated rate and gas is vented from said cooling loop at a flow rate that causes carbon-containing gas to flow upwardly from said cooling zone to said reduction zone.

* * * * *